(12) United States Patent
Coca et al.

(10) Patent No.: US 7,769,725 B2
(45) Date of Patent: Aug. 3, 2010

(54) FILE PROFILING TO MINIMIZE FRAGMENTATION

(75) Inventors: Dinesh C. Coca, Tucson, AZ (US);
James B. Engle, Tucson, AZ (US);
Melissa J. Garcia, Tucson, AZ (US);
Kevan D. Holdaway, Tucson, AZ (US);
Ivan R. Olguin, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 11/738,677

(22) Filed: Apr. 23, 2007

(65) Prior Publication Data

US 2008/0263059 A1    Oct. 23, 2008

(51) Int. Cl.
*G06F 17/30* (2006.01)
(52) U.S. Cl. ............... 707/687; 707/999.002; 707/999.01; 707/999.001; 707/693
(58) Field of Classification Search ......... 711/173; 707/206, 687, 693, 999.001, 999.002, 999.01
See application file for complete search history.

(56) References Cited

U.S. PATENT DOCUMENTS

| | | | |
|---|---|---|---|
| 5,333,311 A | | 7/1994 | Whipple, II |
| 5,675,769 A | * | 10/1997 | Ruff et al. ............ 711/173 |
| 5,832,526 A | | 11/1998 | Schuyler |
| 6,253,300 B1 | * | 6/2001 | Lawrence et al. ........ 711/173 |
| 7,124,272 B1 | * | 10/2006 | Kennedy et al. ........ 711/173 |
| 7,409,523 B2 | * | 8/2008 | Pudipeddi et al. ........ 711/173 |
| 7,506,013 B2 | * | 3/2009 | Schneider ............. 707/206 |

FOREIGN PATENT DOCUMENTS

JP    2001005701 A2    1/2001

OTHER PUBLICATIONS

Remedios, Ian with Kernal Efe and Lois Delcambre, "Parallel Algorithms for Optical Data Allocation in a Dynamic CIM Network," 646-655, The University of Southwestern Louisiana, Layfayette, Lousiana.
Ferreira, Paulo and Marc Shapiro, Distribution and Persistence in Multiple and Heterogeneous Address Spaces, 83-93, Inria, Project SOR, Le Chesnay Cedex, France.
"Free Space Parameter for Magneto-optic Media," IBM Technical Disclosure Bulletin, Aug. 1992, 426-427, vol. 35, pub. No. 3.
"Object-Based Selective Defragmentation Algorithm for Magneto Optic Media," IBM Technical Disclosure Bulletin, Aug. 1993, 399-401, vol. 36, pub. No. 8.

* cited by examiner

*Primary Examiner*—Jean M Corrielus
(74) *Attorney, Agent, or Firm*—Griffiths & Seaton PLLC

(57) ABSTRACT

A storage device implements a file profiling mechanism to minimize fragmentation. A plurality of files is organized according to a high or low read/write access frequency. A plurality of unchanging file types are placed in a first grouping. A plurality of oscillating file types are placed in a second grouping adjacent to the first grouping. A plurality of the high frequency read/write access files which are growing file types are placed in a third grouping adjacent to the second grouping. A remainder of the growing file types not placed in the third grouping is defragmented. The remainder of the growing file types is then placed in a fourth grouping adjacent to the third grouping.

20 Claims, 4 Drawing Sheets

FILE PROFILING TO MINIMIZE FRAGMENTATION

BACKGROUND OF THE INVENTION

1. Field of the Invention

The present invention relates in general to computers, and more particularly to a method of file profiling to minimize fragmentation in storage devices.

2. Description of the Prior Art

Computer storage devices such as hard disk drives (HDDs) provide the persistent magnetic media that much of the worlds electronic data is stored. One the of primary rationales for storing data on hard disk drives are their characteristics of direct access storage devices allows for efficient access to random locations within the storage device as compared to other storage media such as sequential access devices like tape media and drives. Hard disk drives are more efficient in accessing data due in part to their mechanical construction and the geometry that is employed to allow the media platters and read/write heads to very quickly be repositioned to disparate locations of the media storage.

A typical, so-called hard disk "defragmenter" will perform two operations. First, the defragmenter will try to eliminate file fragmentation. Second, the defragmenter will compact the file system of the storage device.

Defragmenters currently known in the art tend to leave the respective storage device in a state which will readily fragment again. The defragmenters incorporate algorithms which rely on static file sizes to discourage fragmentation.

SUMMARY OF THE INVENTION

File sizes often change in predictable ways, however. A need exists for a defragmentation algorithm that uses information about how files sizes change to intelligently defragment a hard drive. Files that fragment easily could be accessed the most frequently. In addition, a need exists for a mechanism to determine which files are most likely to be accessed often and means for the defragmenter to guarantee that these files will be least likely to fragment again.

Accordingly, in one embodiment, the present invention is a method of file profiling to minimize fragmentation in a storage device, comprising organizing a plurality of files according to a high or low read/write access frequency, placing a plurality of unchanging file types in a first grouping, placing a plurality of oscillating file types in a second grouping adjacent to the first grouping, placing a plurality of the high frequency read/write access files which are growing file types in a third grouping adjacent to the second grouping, defragmenting a remainder of the growing file types not placed in the third grouping, and placing the remainder of the growing file types in a fourth grouping adjacent to the third grouping.

In another embodiment, the present invention is a method of file profiling to minimize fragmentation in a storage device, comprising uniformly dividing the total file size of the storage device by a plurality of file type groupings, and assigning each of a plurality of directories to each of the plurality of file types, wherein an unchanging file type grouping is given a higher priority rank of storage location than an oscillating file type grouping.

In still another embodiment, the present invention is an article of manufacture including code for file profiling to minimize fragmentation in a storage device, wherein the code is capable of causing operations to be performed comprising organizing a plurality of files according to a high or low read/write access frequency, placing a plurality of unchanging file types in a first grouping, placing a plurality of oscillating file types in a second grouping adjacent to the first grouping, placing a plurality of the high frequency read/write access files which are growing file types in a third grouping adjacent to the second grouping, defragmenting a remainder of the growing file types not placed in the third grouping, and placing the remainder of the growing file types in a fourth grouping adjacent to the third grouping.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
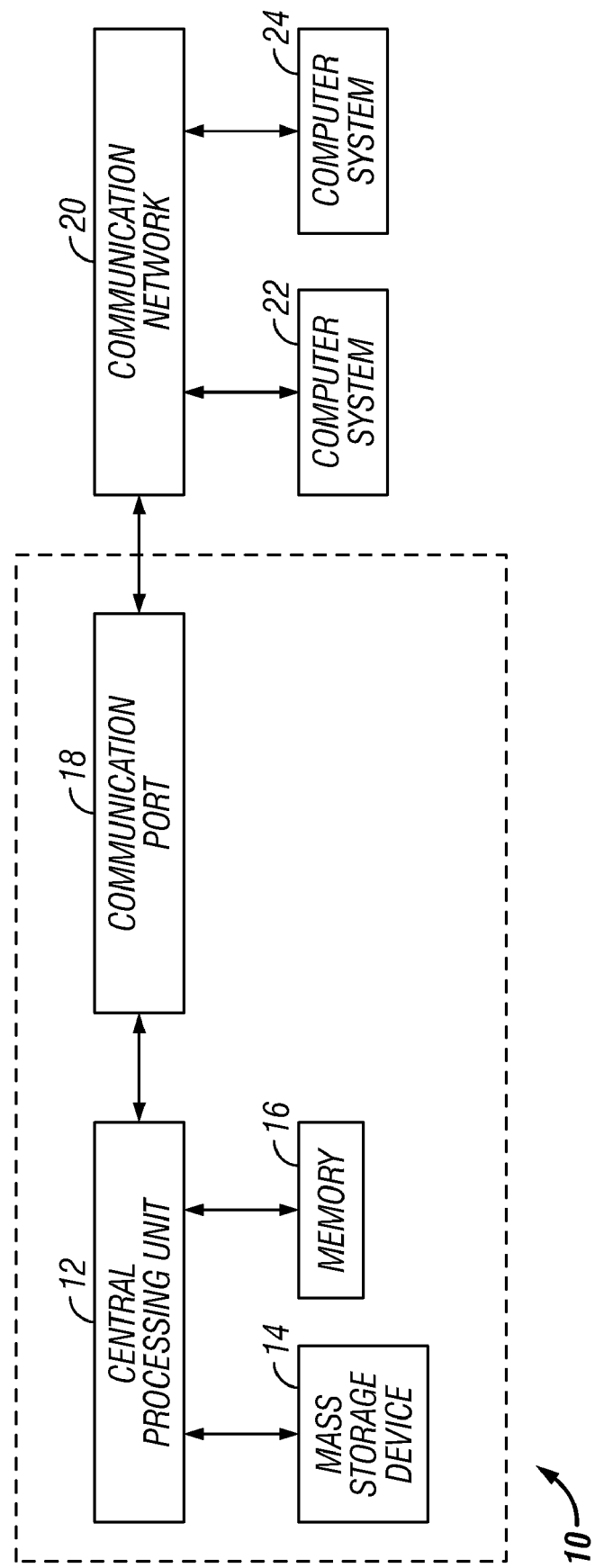
FIG. 1 illustrates a computer system environment having an example storage device in which aspects of the present invention can be realized.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used in the following specification and delineated in the later claims, use of the word "unchanging" is intended to refer to a file size which remains constant. Use of the word "growing" refers to a file or files which continue to grow over a period of time. Use of the word "oscillating" refers to a file or files which grow and shrink.

Turning to FIG. 1, an example computer system 10 is depicted which can implement various aspects of the present invention. Computer system 10 includes central processing unit (CPU) 12, which is connected to mass storage device(s) 14 and memory device 16. Mass storage devices can include hard disk drive (HDD) devices which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal bearing medium. In addition, CPU 12 is connected through communication port 18 to a communication network 20, having an attached plurality of additional computer systems 22 and 24.

Figure 2A:
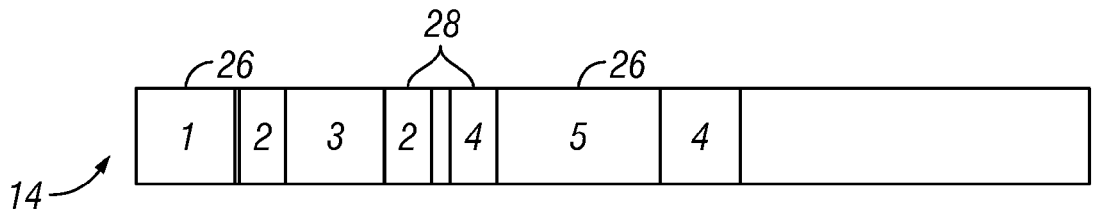
FIG. 2A illustrates a conceptual depiction of a fragmented file system on a storage device.

FIG. 2A depicts a sample fragmented file system on a HDD 14. Files 26 and 28 are fragmented across the file system of the HDD 14 as shown. In contrast, FIG. 2B illustrates a file system of an HDD 14 after a defragmenter performs a defragment and compacting procedure consistent with those known in the prior art.

Figure 2B:
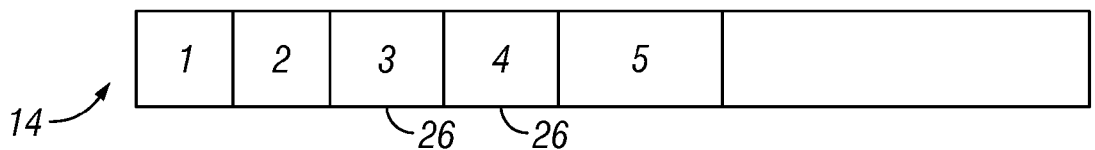
FIG. 2B illustrates a conceptual depiction of a non-fragmented file system on a storage device.

In contrast to the conceptual defragment and compacting procedure shown in FIGS. 2A and 2B, the present invention provides an intelligent defragmentation algorithm that uses file growth and reduction patterns to allow files to change without fragmentation. Instead of simply compacting the file system like traditional defragmenters, the present invention incorporates an algorithm which leaves enough free space to allow the file to change without fragmentation. The amount of space left is determined by a respective file's growth/reduction patterns which are determine by lightweight profiling.

There are cases when all files cannot receive a lasting defragmentation. In one embodiment, the present invention incorporates an algorithm which provides a mechanism to determine file priority based on frequency of access. Files that are accessed the most frequently will be given priority over less accessed files in the defragmentation algorithm.

For the algorithm of the present invention to operate, in one embodiment, two pieces of information are required, a so-called "growth/reduction" pattern, and the access frequency of a respective file. The size of a respective file can vary over a period of time. A growth/reduction pattern can be interpolated from an examination of the history of the file, to identify how the file size varies. In addition, some files are read on a more frequent basis than other files. The access frequency of a respective file can also be interpolated from an examination of the file's history.

In constructing growth/reduction patterns for respective files, the foregoing terms "unchanging", "growing" and "oscillating" can be defined for the algorithm according to the present invention. Again, an unchanging file has an accompanying file size which remains constant. A growing file is a file whose file size continues to grow over a period of time. Finally, an oscillating file grows and becomes smaller over a period of time. During a write operation of the storage device, the file system can update system metadata to record such information. As one skilled in the art will appreciate, the profiling statistics above such as a growth/reduction pattern, do not represent the totality of profiling statistics which can be used to accomplish similar purposes. Other statistical information besides growth/reduction pattern and/or access frequency information can be maintained, so long as the statistics can be used to intelligently organize data.

In addition to the foregoing, in one embodiment, the following fields (with accompanying definitions) can be added to the metadata of the file system and stored locally, or remotely: (1) "growth count", referring to recording the number of times a respective file size has increased (the growth count is impacted when a file size increases, and is correspondingly updated); (2) "reduction count", referring to recording the number of times in which the file size has decreased (similar in operation to the growth count); (3) "maximum file size", referring to recording the largest size for the file (and possibly having an associated time period); (4) "maximum growth size", referring to the largest X growth changes in the last Y seconds (delta sizes, and not absolute sizes); (5) "minimum file size", referring to recording the smallest size for the file (again, like maximum file size, possible having an associated time period); (6) "maximum reduction size", referring to the largest X reductions in the last Y seconds (similar in operation to maximum growth size); and finally (7) "growth pattern", again referring to whether the file is unchanging, growing, or oscillating.

In one embodiment, for maximum growth size and maximum reduction size metadata information, the algorithm can record the largest five (5) growth changes or reductions in the last thirty (30) seconds. As one skilled in the art will appreciate, the values of X and Y can be adjusted as needed to fit a particular application or to tailor the algorithm for a specific implementation. Again, statistical information such as the maximum growth size and maximum reduction size, as well as other statistical information previously described can be stored both locally and remotely (e.g., using metadata of the file system or using memory devices in various forms).

In one embodiment, the present invention can define a respective file's growth pattern using the following formula. An unchanging growth pattern can be defined as having a growth count and a reduction count=zero (0). Because the file is unchanging, neither the growth count nor the reduction count are impacted. A growing growth pattern can be defined in situations where the growth count >zero (0) and the reduction count=zero (0). Because the file is growing in size, the growth count is impacted and is updated every time the respective file grows. For example, if the file size has increased a total of five (5) times, and not decreased any times, the growth count value is five (5), and the reduction count is value zero (0). Such a file can be said to have a growing growth pattern.

Because the reduction count reflects the number of times that a file decreases in size, the reduction count value can also be zero (0) or a positive number. An oscillating growth pattern can be defined in situations where the growth count >zero (0) and the reduction count >zero (0). If a file has increased in size a total of five (5) times and decreased in size five (5) times, the growth count value is five (5) and the reduction count value is also five (5). Such a file can be said to have an oscillating growth pattern. Similar formulas can be devised and tailored for a specific implementation or situation.

In order to efficiently use the available storage, an algorithm according to the present invention can first evaluate the frequency of file read/write operations. The evaluation process is critical due to limitations of disk capacity inherent to every storage device. Not every file can be placed in an optimal location during defragmentation. The defragmentation algorithm uses the read/write access frequency to first place regularly used files in their preferred location.

The algorithm can use the file change patterns to partition files on the file system into two groups. The first group can include files that can have a fixed amount of space and still not fragment. This includes unchanging files and oscillating files. The second group can include files that continue to grow. These files likely will become fragmented sooner. Files in this group are ranked according to the frequency they are accessed. Files that are accessed frequently are given priority.

Again, while a particular defragmentation algorithm is described in one embodiment, one skilled in the art will appreciate that other algorithms can be constructed to include differing file growth/reduction pattern methodologies or other relevant statistical information, for example.

Figure 3:
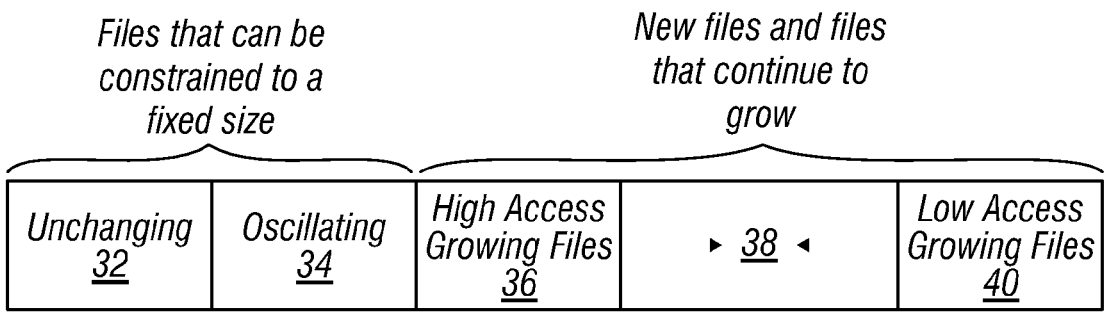
FIG. 3 illustrates an example file layout according to a file profiling method according to the present invention.

Turning to FIG. 3, a conceptual diagram of an exemplary defragmentation scheme 30, which can be implemented according to the present invention, is depicted. Scheme 30 represents a file system 30 of a HDD storage device 14. Unchanging files 32 are given first priority as far as choice of location in the file system, as those files do not change. Adjacent to the unchanging files 32 are oscillating files 34. Both oscillating files 34 and unchanging files 32 can be constrained to a fixed size corresponding to a file size on the storage device.

Adjacent to oscillating files 34 are high access frequency, growing files 36, dynamic space 38, and low access frequency, growing files 40. Dynamic space 38 can be reserved by the algorithm and files 36, 40 can expand and contract as necessary to take up or give back respective dynamic space 38.

Figure 4:
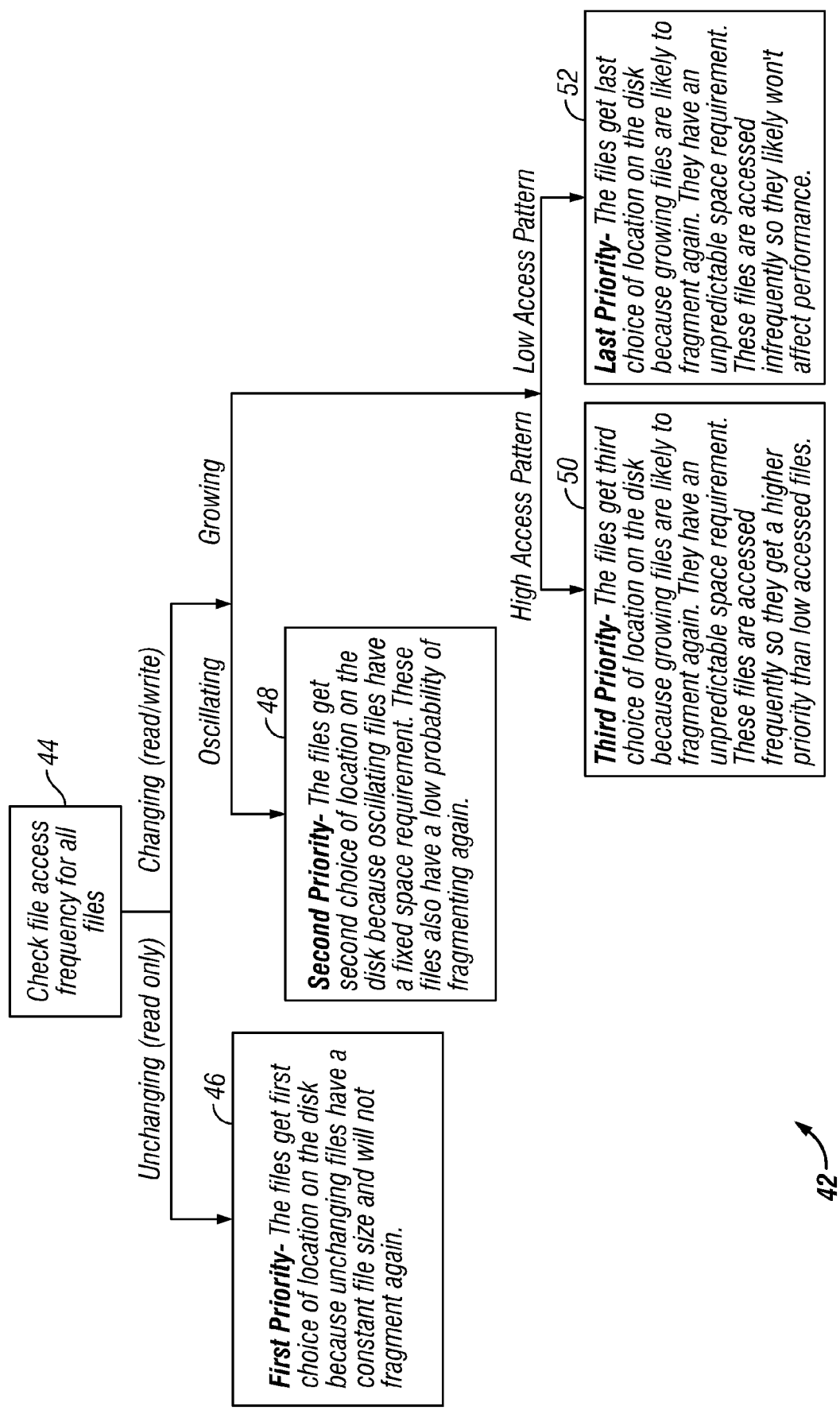
FIG. 4 conceptually illustrates an example priority scheme for defragmenting a storage device according to aspects of the present invention.

FIG. 4 now illustrates a conceptual priority scheme 42 for defragmenting a file according to aspects of the present invention. The algorithm can first check fill access frequency for all respective files as shown in box 44, as a preliminary matter. Again, first priority for choice of storage location is given to unchanging files 46. The unchanging files 46 can receive first choice of location on the disk because the unchanging files have a constant file size and will not fragment again.

Second priority is given to oscillating files 48, which receive a second choice of location on the disk because the oscillating files have a fixed space requirement. These files 48 also have a low probability of fragmenting again. Third priority is given to high access, growing files 50, because these files 50 are likely to fragment again. The files have an unpredictable space requirement. The files are access frequently, so the files 50 receive a higher priority than lower accessed, growing files 52. Low access pattern, growing files 52 receive the last choice of location on the disk because the growing files are likely to fragment again. The files 52, again, have an unpredictable space requirement. However, the files are accessed infrequently, so the files 52 likely won't affect performance.

In one embodiment, the implementation of the defragmentation method includes the following steps. First, files are categorized according the read/write access frequency. (High or Low). All unchanging file types (read-only) are placed in a compact group. Each unchanging file receives only space for the constant file size. All oscillating file types are then placed near the unchanging files. Each oscillating file receives the maximum file size recorded as part of the metadata information previously described.

As a next step, all high frequency read/write access files that are type growing file are placed after the oscillating files, and at the end of the disk. The two groups grow together as shown in FIG. 3. The algorithm uses the maximum growth sizes (delta sizes) to determine the growth rate over time. A respective file is given enough space to remain defragmented for a reasonable amount of time. Files with faster growth rates are not guaranteed to stay defragmented. Finally, all remaining growth type files are defragmented, giving them space similar to those selected in the high frequency read/write access files of growing type. These files are the least likely to remain defragmented, but they are also the least likely to be used.

Figure 5:
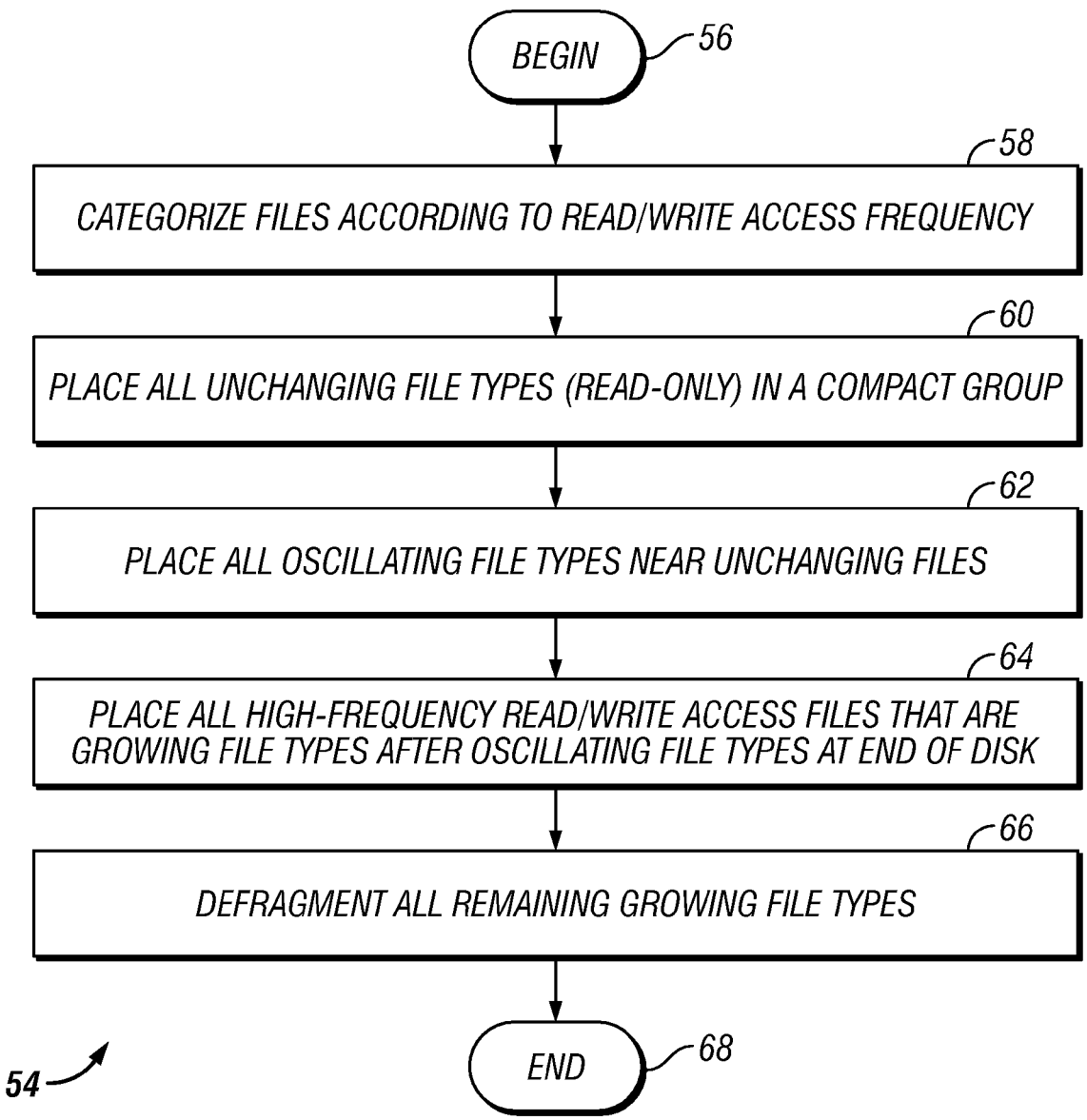
FIG. 5 illustrates an example method of operation in which various aspects of the present invention can be implemented.

FIG. 5 describes an example method of operation according to the foregoing. The method 54 begins (step 56) by the categorization of files according to read/write access frequency as described. As a next step, all unchanging file types (read-only) are placed in a compact group (step 60). All oscillating files are then placed adjacent to unchanging files (step 62). All high frequency read/write access files that are growing type are placed after the oscillating file types, and at the end of the disk (step 64). All remaining growth file types are then defragmented (step 66). The method 54 then ends (step 68).

Again, as one skilled in the art will appreciate, in some embodiments, not all unchanging, oscillating, or high-frequency read/write access file types can be separated. A predefined amount, tailored for a specific application or implementation, can also be selected.

Method 54, as described, will provide an optimized defragmentation. In general, optimized defragmentation is considered to be a dynamic and adaptive algorithm. The classification of files according to file growth/reduction patterns is a matter of ongoing experience. Upon defragmentation of a file system, file growth/reduction patterns will dictate the specific space requirements to reserve/remove per file in order to reduce the ongoing need for frequent defragmentation.

However, from an operational point of view, there are additional steps that may be taken to support the reduction in defragmentation activities. First, policies could easily be developed from prior user experience to determine an initial policy for segmenting the file system into areas appropriate for different file categories (ever growing, unchanging, oscillating, etc.) For example, another embodiment can uniformly divide the file system size by the number of categories and assign directories a priori to a specific segment. The embodiment can again implement a prioritization scheme as previously described, where unchanging files are given the highest priority. OS files can be assigned to the unchanging segment. User documents can be assigned to the growing segment. System logs and file recycling can be assigned to the oscillating segment.

As a respective file system fills, defragmentation will become inevitable, but an initial policy based on long periods of prior user experience could potentially increase the mean time before defragmentation is required.

Software and/or hardware to implement the method 54, or other functions previously described, such as the described categorization of files according to read/write access frequency, can be created using tools currently known in the art. The implementation of the described system and method involves no significant additional expenditure of resources or additional hardware than what is already in use in standard computing environments utilizing RAID storage topologies, which makes the implementation cost-effective.

Implementing and utilizing the example systems and methods as described can provide a simple, effective method of maintaining files on a storage device, and serves to maximize the performance of a storage system, or overall computer system. While one or more embodiments of the present invention have been illustrated in detail, the skilled artisan will appreciate that modifications and adaptations to those embodiments may be made without departing from the scope of the present invention as set forth in the following claims.

What is claimed is:

1. A method of file profiling to minimize fragmentation in a storage device, comprising:
    organizing a plurality of files according to a high or low read/write access frequency;
    placing a plurality of unchanging file types in a first grouping;
    placing a plurality of oscillating file types in a second grouping adjacent to the first grouping;
    placing a plurality of high frequency read/write access files which are growing file types in a third grouping adjacent to the second grouping;
    defragmenting a remainder of the growing file types not placed in the third grouping; and
    placing the remainder of the growing file types in a fourth grouping adjacent to the third grouping;
    wherein each of the first, second, third, and fourth groupings share similar file growth and reduction patterns, allowing for file changes without fragmentation.

2. The method of claim 1, wherein the first grouping is organized with a higher priority rank of storage location than the second grouping.

3. The method of claim 1, wherein the third grouping is organized with a lower priority rank of storage location than the second grouping.

4. The method of claim 1, wherein each of the plurality of unchanging file types is allocated space corresponding to a constant file size.

5. The method of claim 1, wherein, upon a write operation, the storage device updates a storage system metadata location to record information.

6. The method of claim 5, wherein the information further includes growth count, reduction count, maximum file size, maximum growth size, minimum file size, maximum reduction size, and growth pattern data.

7. The method of claim 6, wherein the storage device analyzes the maximum growth size data to determine a growth rate over time.

8. An article of manufacture including computer readable instructions that are executable by a computer to perform a method for file profiling to minimize fragmentation in a storage device, wherein the method comprising:
    organizing a plurality of files according to a high or low read/write access frequency;
    placing a plurality of unchanging file types in a first grouping;
    placing a plurality of oscillating file types in a second grouping adjacent to the first grouping;
    placing a plurality of the high frequency read/write access files which are growing file types in a third grouping adjacent to the second grouping;
    defragmenting a remainder of the growing file types not placed in the third grouping; and
    placing the remainder of the growing file types in a fourth grouping adjacent to the third grouping:
    wherein each of the first, second, third, and fourth groupings share similar file growth and reduction patterns, allowing for file changes without fragmentation.

9. The article of manufacture of claim 8, wherein the first grouping is organized with a higher priority rank of storage location than the second grouping.

10. The article of manufacture of claim 8, wherein the third grouping is organized with a lower priority rank of storage location than the second grouping.

11. The article of manufacture of claim 8, wherein each of the plurality of unchanging file types is allocated space corresponding to a constant file size.

12. The article of manufacture of claim 8, wherein, upon a write operation, the storage device updates a storage system metadata location to record information.

13. The article of manufacture of claim 12, wherein the information further includes growth count, reduction count, maximum file size, maximum growth size, minimum file size, maximum reduction size, and growth pattern data.

14. A system of file profiling to minimize fragmentation in a storage device, comprising:
    a processor device in communication with the storage device, wherein the processor device is adapted for:
        organizing a plurality of files according to a high or low read/write access frequency, placing a plurality of unchanging file types in a first grouping, placing a plurality of oscillating file types in a second grouping adjacent to the first grouping, placing a plurality of high frequency read/write access files which are growing file types in a third grouping adjacent to the second grouping, defragmenting a remainder of the growing file types not placed in the third grouping, and placing the remainder of the growing file types in a fourth grouping adjacent to the third grouping;

wherein each of the first, second, third, and fourth groupings share similar file growth and reduction patterns, allowing for file changes without fragmentation.

15. The system of claim 14, wherein the first grouping is organized with a higher priority rank of storage location than the second grouping.

16. The system of claim 14, wherein the third grouping is organized with a lower priority rank of storage location than the second grouping.

17. The system of claim 14, wherein each of the plurality of unchanging file types is allocated space corresponding to a constant file size.

18. The system of claim 14, wherein the processor device is further adapted for, upon a write operation, updating a storage system metadata location to record information.

19. The system of claim 18, wherein the information further includes growth count, reduction count, maximum file size, maximum growth size, minimum file size, maximum reduction size, and growth pattern data.

20. The system of claim 19, wherein the processor device is further adapted for analyzing the maximum growth size data to determine a growth rate over time.

* * * * *